US010171506B2

(12) United States Patent
Chechani

(10) Patent No.: US 10,171,506 B2
(45) Date of Patent: Jan. 1, 2019

(54) NETWORK SECURITY MANAGEMENT VIA SOCIAL MEDIA NETWORK

(71) Applicant: Fortinet, Inc., Sunnyvale, CA (US)

(72) Inventor: Pankajkumar Chechani, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 390 days.

(21) Appl. No.: 15/075,819

(22) Filed: Mar. 21, 2016

(65) Prior Publication Data

US 2017/0272468 A1 Sep. 21, 2017

(51) Int. Cl.
*H04L 29/06* (2006.01)
*H04L 29/08* (2006.01)

(52) U.S. Cl.
CPC ............ *H04L 63/20* (2013.01); *H04L 63/102* (2013.01); *H04L 67/10* (2013.01); *H04L 67/306* (2013.01); *H04L 67/42* (2013.01)

(58) Field of Classification Search
CPC ....... H04L 63/20; H04L 63/102; H04L 67/10; H04L 67/306; H04L 67/42
See application file for complete search history.

(56) References Cited

U.S. PATENT DOCUMENTS

| 9,043,870 | B1 * | 5/2015 | Barenholz | H04L 63/0815 |
| | | | | 726/2 |
| 9,154,488 | B2 * | 10/2015 | Innes | H04L 63/08 |
| 9,231,939 | B1 * | 1/2016 | Morrison | G06F 21/6218 |
| 9,288,056 | B1 * | 3/2016 | Spagnola | H04L 63/0428 |
| 9,300,676 | B2 * | 3/2016 | Madhu | G06Q 50/265 |
| 9,369,433 | B1 * | 6/2016 | Paul | H04L 63/0227 |
| 9,467,474 | B2 * | 10/2016 | Barton | G06F 9/45533 |
| 9,576,270 | B1 * | 2/2017 | Afshar | H04L 29/06027 |
| 9,674,669 | B2 * | 6/2017 | Subramanian | H04W 4/04 |
| 9,942,259 | B2 * | 4/2018 | Madhu | G06Q 50/265 |
| 2011/0083167 | A1 * | 4/2011 | Carpenter | G06F 17/30563 |
| | | | | 726/4 |
| 2012/0136936 | A1 * | 5/2012 | Quintuna | G06F 21/604 |
| | | | | 709/204 |
| 2013/0042169 | A1 * | 2/2013 | Reedy | H04L 67/02 |
| | | | | 715/202 |
| 2013/0254296 | A1 * | 9/2013 | Lai | H04L 51/32 |
| | | | | 709/205 |
| 2014/0068722 | A1 * | 3/2014 | Hayat | G06Q 20/02 |
| | | | | 726/4 |

(Continued)

*Primary Examiner* — Joseph P Hirl
*Assistant Examiner* — Stephen T Gundry
(74) *Attorney, Agent, or Firm* — Hamilton, DeSanctis & Cha LLP

(57) ABSTRACT

Systems and methods for managing users' local security policies based on social media network information are provided. According to one embodiment, a network security appliance of a private network receives authentication request from a client machine and provides a social login interface of a social media network to the client machine. After a user of the client machine is authenticated by the social media network through a personal social media network account of the user, the network security appliance receives an authentication and a user profile of the user from the social media network. The network security appliance extracts social relationship information from the user profile and determines a local network security policy for the user based on the social relationship information.

20 Claims, 6 Drawing Sheets

(56) References Cited

U.S. PATENT DOCUMENTS

| | | | |
|---|---|---|---|
| 2014/0115683 A1* | 4/2014 | Stass | H04L 63/0884 726/9 |
| 2014/0282977 A1* | 9/2014 | Madhu | G06Q 50/265 726/7 |
| 2015/0281393 A1* | 10/2015 | Sng | H04L 67/22 709/204 |
| 2015/0334102 A1* | 11/2015 | Haugsnes | G06F 21/31 726/1 |
| 2015/0372994 A1* | 12/2015 | Stuntebeck | H04L 63/0464 713/156 |
| 2015/0381621 A1* | 12/2015 | Innes | G06F 21/31 726/7 |
| 2016/0142382 A1* | 5/2016 | Ziebell | H04L 63/0428 713/168 |
| 2016/0154975 A1* | 6/2016 | Sorensen | H04L 67/306 726/28 |
| 2016/0219114 A1* | 7/2016 | Keyani | H04W 4/21 |
| 2017/0019409 A1* | 1/2017 | Shalunov | H04L 12/6418 |
| 2017/0034179 A1* | 2/2017 | Carames | H04L 63/10 |
| 2017/0041271 A1* | 2/2017 | Tal | H04L 43/045 |
| 2017/0041304 A1* | 2/2017 | Tal | G06F 1/32 |
| 2017/0041381 A1* | 2/2017 | Tal | H04L 67/10 |
| 2017/0041388 A1* | 2/2017 | Tal | G06F 17/2705 |
| 2017/0048257 A1* | 2/2017 | Hamid | G06F 21/31 |
| 2017/0111385 A1* | 4/2017 | Madhu | G06Q 50/265 |
| 2017/0118025 A1* | 4/2017 | Shastri | G06F 21/32 |
| 2017/0163615 A1* | 6/2017 | Ho | H04L 63/083 |
| 2017/0257454 A1* | 9/2017 | Hughes | H04W 4/21 |
| 2018/0007059 A1* | 1/2018 | Innes | G06F 21/33 |
| 2018/0109485 A1* | 4/2018 | Lai | H04L 51/32 |

* cited by examiner

NETWORK SECURITY MANAGEMENT VIA SOCIAL MEDIA NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to the field of network security. In particular, various embodiments relate to network security via social media network.

Description of the Related Art

Usually, user authentications of a private network (e.g., an enterprise network) are managed by a local authentication server within the private network. When a new user joins the private network, the administrator of the private network will create a new account to the local authentication server for the new user. The administrator assigns a user name that is unique in the private network to the new user. The administrator may also assign the new user to one or more user groups. Network security policies may be created for the new user or the user group within a firewall of the private network to control network traffic going to the user or user group and determine what network resources can be accessed by the new user or the group.

Another type of user authentication is through social login (a/k/a social sign-in). Currently, over one billion users are members of social media networks (e.g., Facebook, Twitter, LinkedIn and Google+). When a user joins a social networking service, he/she needs to create a social media network account with a unique user ID on the social networking service. A social media network may provide social login services to private networks. A private network may allow users or guests to access local network resources if a user can be authenticated by social login of a social media network. For example, when a guest is within the coverage area of wireless access points (APs) of the private network, a wireless access point (AP) controller (AC) may provide a social login interface to the guest. If the guest is authenticated by the social login, the AC may allow the guest to access the Internet through the APs.

For local user authentications, problems arise after creating user databases with user groups and different access provided to individual candidates in different user groups. The administrator of the private network needs to be specific and undertake the tedious jobs of maintaining the access level for all users. The social login services provided by social media networks, lack access right management for different users within local networks. Therefore, there is a need for social media network account interactions with user based policy, IEEE 802.1x authentications and/or WiFi authentication of a local network.

SUMMARY

Systems and methods for managing users' local security policies based on social media network information are provided. According to one embodiment, a network security appliance of a private network receives an authentication request from a client machine and provides a social login interface of a social media network to the client machine. After a user of the client machine is authenticated by the social media network through a personal social media network account of the user, the network security appliance receives an authentication and a user profile of the user from the social media network. The network security appliance extracts social relationship information from the user profile and determines a local network security policy for the user based on the social relationship information.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
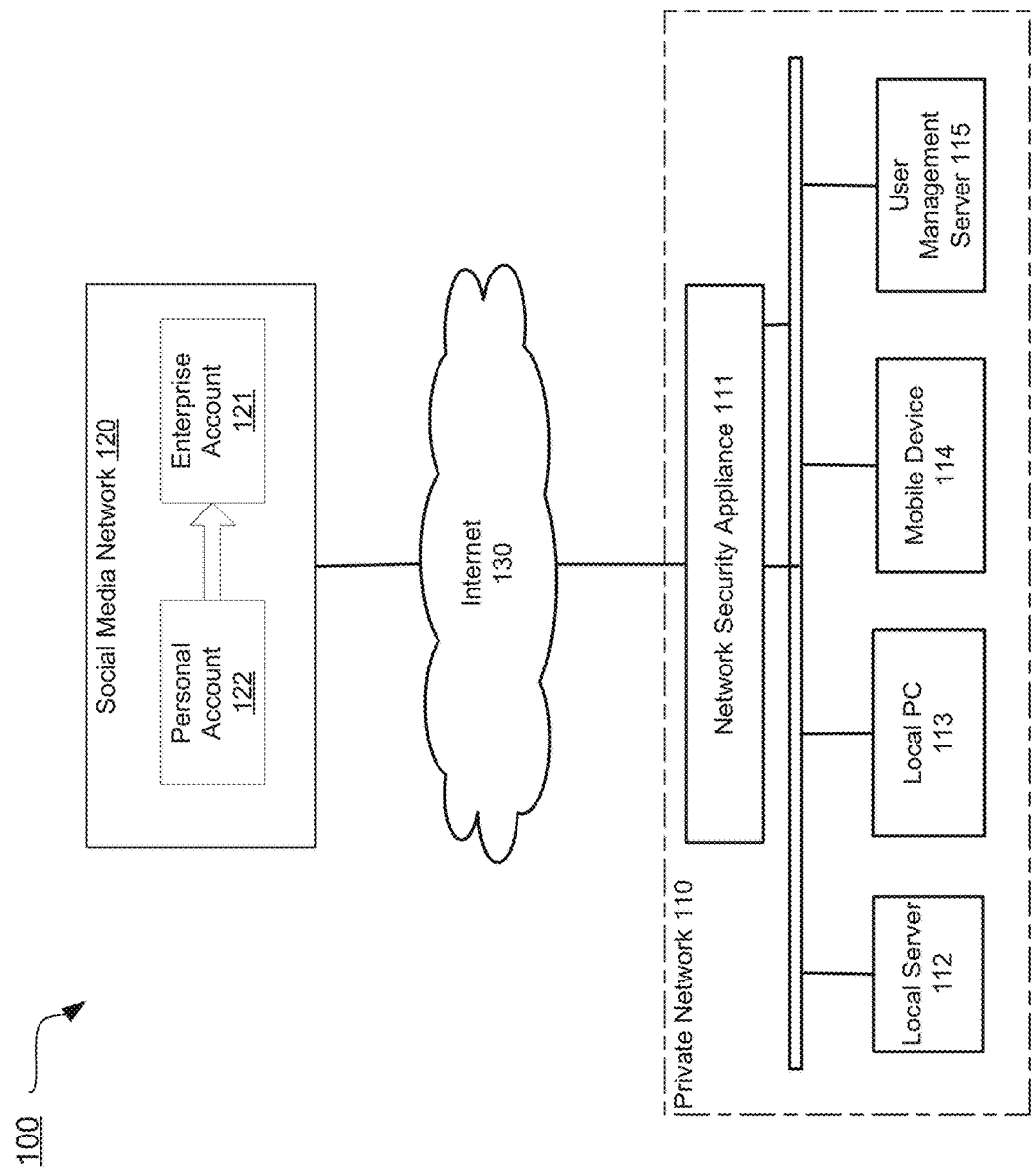
FIG. 1 illustrates exemplary network architecture in accordance with an embodiment of the present invention.

Systems and methods for managing users' local security policies based on social media network information are provided. According to one embodiment, a network security appliance of a private network receives an authentication request from a client machine and provides a social login interface of a social media network to the client machine. After a user of the client machine is authenticated by the social media network through a personal social media network account of the user, the network security appliance receives an authentication and a user profile of the user from the social media network. The network security appliance extracts social relationship information from the user profile and determines a local network security policy for the user based on the social relationship information.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phase phrase "security device" generally refers to a hardware device or appliance configured to be coupled to a network and to provide one or more of data privacy, protection, encryption and security. The network security device can be a device providing one or more of the following features: network firewalling, Virtual Private Networking (VPN), antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, VPN, IP security (IPSec), Secure Sockets Layer (SSL), antivirus, intrusion detection, intrusion prevention, Web content filtering, spyware prevention and antispam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

The phrases "social media network," "social networking service" and the like generally refer to online services, platforms, or websites that focus on facilitating the building of social networks or social relations among people who, for example, share interests, activities, backgrounds, or real-life connections. Non-limiting examples of social networking services include, but are not limited to, Facebook, Twitter, LinkedIn and Google+.

FIG. 1 illustrates exemplary network architecture 100 in accordance with an embodiment of the present invention. In the present example, a private network 110 and a social media network 120 are connected through a public network, such as the Internet 130.

Private network 110 may include multiple network appliances, such as a network security appliance 111, a local server 112, a local personal computer (PC) 113, a mobile phone 114, a user management server 115 and other computing devices that are operatively coupled to each other through a Local Area Network (LAN), wherein the LAN is then operatively coupled with network security appliance 111 which enable access to Internet 130.

Network security appliance 111 separates the external computing environment, represented by Internet 130, from the internal computing environment of private network 110. Network security appliance 111 may intercept communications between Internet 130 and the network appliances of private network 110 and may, among other things, scan for malware, viruses or high risk network accesses.

User management server 115 is used for managing a social media network account of private network 110 on social media network 120 and managing users' security based on users' social relationships with the social media network account of the private network 110 instead of local user authentication. An administrator of private network 110 may create an enterprise account 121 within social media network 120 for private network 110. Social media network 120 may be Facebook™, Twitter™, LinkedIn™, Google+™ or other social media networks that provide online social networking services to the public and provide social login services to third party networks. Multiple groups under enterprise account 121 may also be created if a grouping function under a social media network account is allowed by social media network 120. The groups may be open groups that allow any social media network user to join without approval from enterprise account 121. The groups may be closed group that users, such as employees of an enterprise, that are approved by enterprise account 121 may be allowed to join.

A social media network user may create a personal account 122 within social media network 120. A user name and password will be created within social media network 120 for user authentication before the social media network user can access social media network 120. Personal account 122 may join enterprise account 121 or become a member of a group of enterprise account 121. For example, a social media network user may establish a social relationship with an enterprise account within social media network 120 by "liking" an enterprise account or group within Facebook, "following" an enterprise account or group within Twitter, "plus one" an enterprise account or group within Google+ or "following" an enterprise account or group within LinkedIn.

If the enterprise account or group is open to anyone, the personal account may join the enterprise account/group automatically without approval from the enterprise account. For example, a social media network account of an enterprise within a social media network usually allows any user of the social media network join it. Customers or people who are interested in news relating to the enterprise may join the enterprise account freely. If the enterprise group is a closed group, requests to join the group are sent to the group administrator when social media network users would like to join the group. The administrator may allow or reject the requests. For example, the administrator may create an employee group within a social media network and only those requests from employees of the enterprise may be allowed to join the employee group.

When a client machine joins private network 110 through a LAN connection or WiFi connection, an authentication request is sent from the client machine to user management server 115. User management server 115 provides a social login interface of social media network 120 to the client machine. A user can provide his authentication information of personal account 121 to social media network 120 and can be authenticated by social media network 120 if the authentication information is correct. After the user is authenticated by social media network 120, an access token may be sent to user management server 115 of private network 110 from social media network 120. A personal profile of personal account 121 may be retrieved by user management server 115 using the access token. The user profile may include a user ID as well as information regarding a social relationship between personal account 121 and enterprise account 121. For example, the user profile may include information regarding whether the user is a member of an open group or a closed group of enterprise account 121. User management server 115 may determine a security policy for the user within private network 110 based on the membership of the user within social media network 120. For example, if the user is a member of a customer group of enterprise account 121, a basic right, such as accessing the Internet through wireless access points (APs) of private network 110, may be granted to the client machine. If the user is a member of an employee group of enterprise account 121, user management server 115 may grant access rights of the employee group to the client machine. The details of managing users' security policies at a private network based on social relationships between users and an enterprise will be described in further detail below with reference to FIGS. 2A, 2B and 3.

Figure 2A:
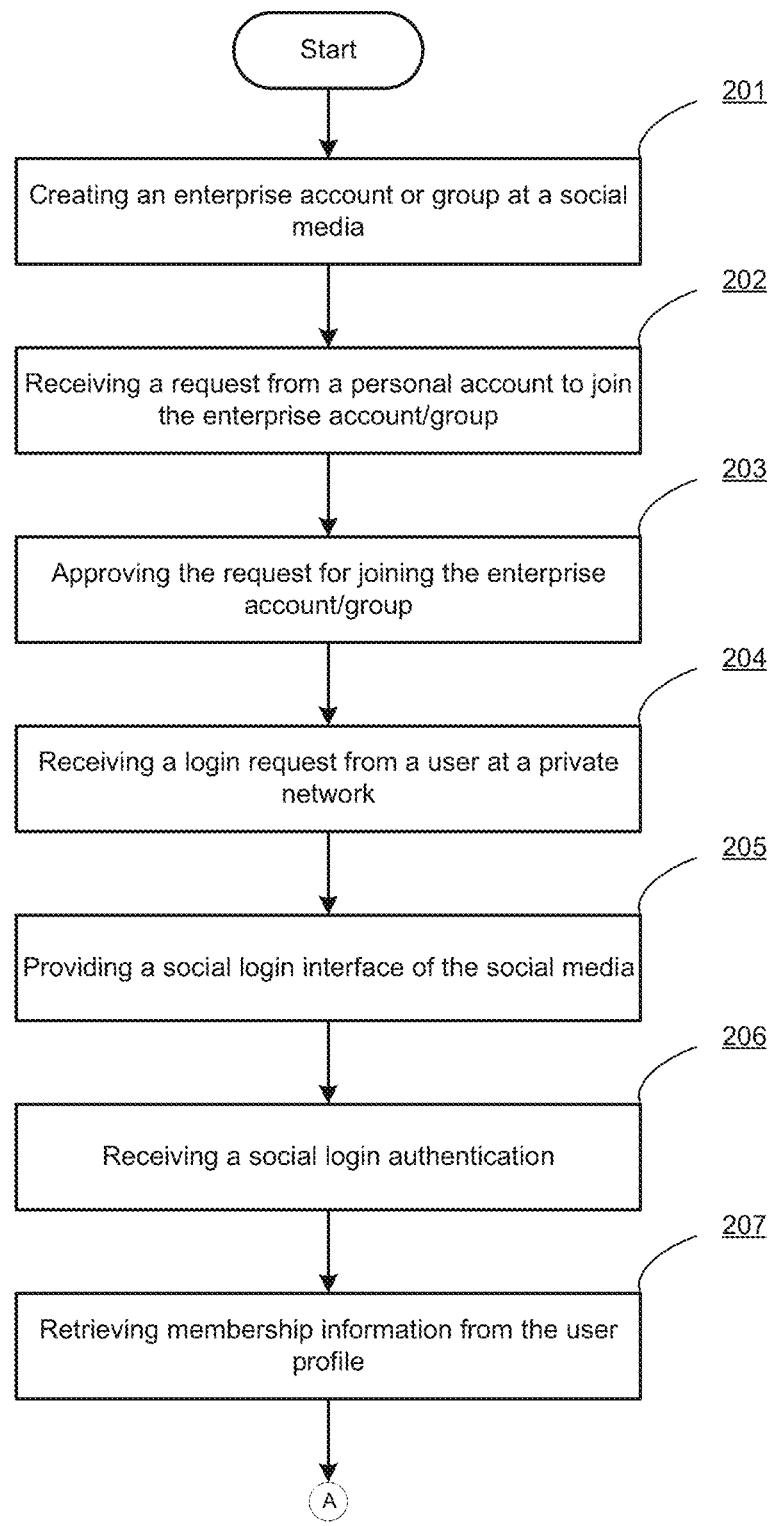
FIGS. 2A and 2B together represent a flow diagram illustrating a process for managing user security policies within a private network based on social relationship information associated with the users' personal social media network account in accordance with an embodiment of the present invention.
Figure 2B:
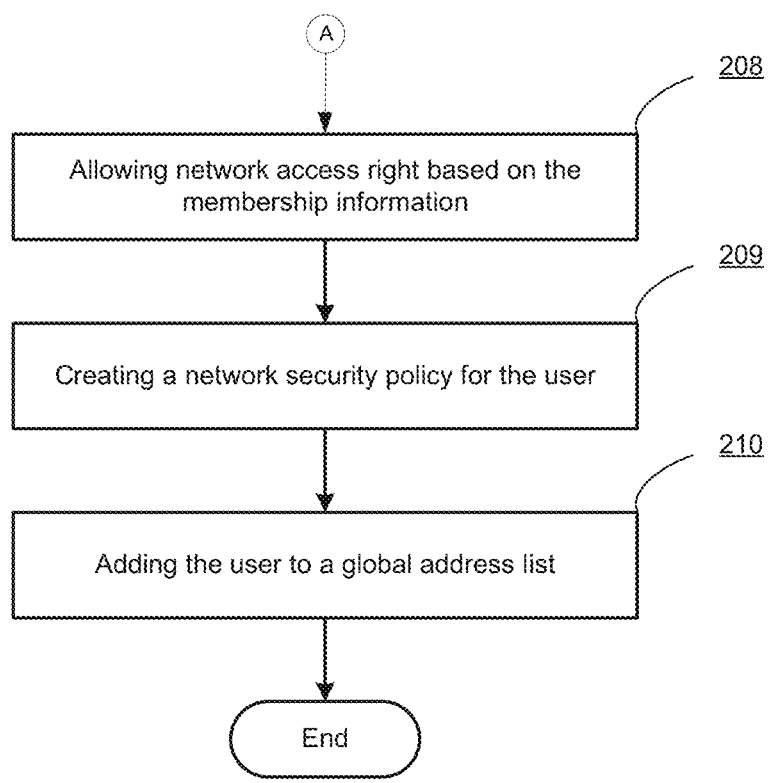

FIGS. 2A and 2B together represent a flow diagram illustrating a process for managing user security policies within a private network based on social relationship information associated with the users' personal social media network account in accordance with an embodiment of the present invention.

At block 201, an administrator of a private network may create an enterprise account within a social media network. Then, multiple groups may be created under the enterprise account. For example, an open "customers" group may be created. The enterprise account or the "customer" group allows any social media network account to join. One or more closed groups under the enterprise account may also be created for different groups of the private network of the enterprise. For example, the administrator may create a group for each department, branch office or subsidiary of the enterprise within the social media network. The groups may be closed groups that the personal social media network accounts of members of departments, branch offices or subsidiaries of the enterprise are allowed to join only after approval by the administrator of the enterprise account. Groups under the enterprise account are used for differentiating the statuses of users of the private network and rights to access the private network can be granted to the users based on the membership of users to various groups. Those skilled in the art will appreciate that different social media networks may have different names for groups under a social media network account. For example, public or private groups may be created for a Facebook account. Listed or unlisted groups may be created for a LinkedIn account. Public or private lists may be created for a Twitter account. If a social media network does not support grouping functionality, then multiple social media network accounts may be created within the social media network for the enterprise in order to emulate such grouping functionality by allowing different personal accounts to join different social media network accounts. For example, the administrator of "Fortinet Inc." creates an enterprise account "Fortinet" within the Facebook social media network, and then creates a closed group "R&D" under the enterprise account "Fortinet".

At block 202, the administrator of an enterprise account of the social media network receives a request to join a closed group from a personal social media network account. In the present example, if a personal social media network account would like to join the "Fortinet" enterprise account within the Facebook social media network, the person may do so without any approval. However, since, the "R&D" group under the enterprise account "Fortinet" is a closed group, when a person would like to join this group, a request is sent to the administrator of the "R&D" group.

At block 203, the administrator of the closed group may approve or deny the request to join the closed group based on whether the person is known to belong to the research and development group within the enterprise. In this example, if a new employee joins the R&D team of Fortinet, he may try to join the closed group "R&D" of "Fortinet" within the Facebook social media network using his personal Facebook account. The administrator then approves this request as the new employee belongs to the "R&D" team of Fortinet. Those skilled in the art will appreciate that a closed group may pre-approve a personal account to join the group. In that case, the personal account may join the group directly without sending a request to the administrator.

At block 204, a user authentication request is received by a user management server of the private network when the user tries to access the private network. In one example, a guest arrives at an office of Fortinet Inc. and he would like to connect to the Internet through a wireless access point (AP) of the office. When the guest tries to connect to an AP, a user authentication request may be sent from the guest's computing device (e.g., a smartphone, a laptop or a tablet computer) to an AP controller (AC) of the private network of Fortinet. The user authentication request may be forwarded by the AC to the user management server for authentication. In another example, when an employee of Fortinet Inc. connects his device to the private network of Fortinet through a local area network (LAN) or a VPN connection, a user authentication is sent from the employee's device to a user management server.

Figure 3:
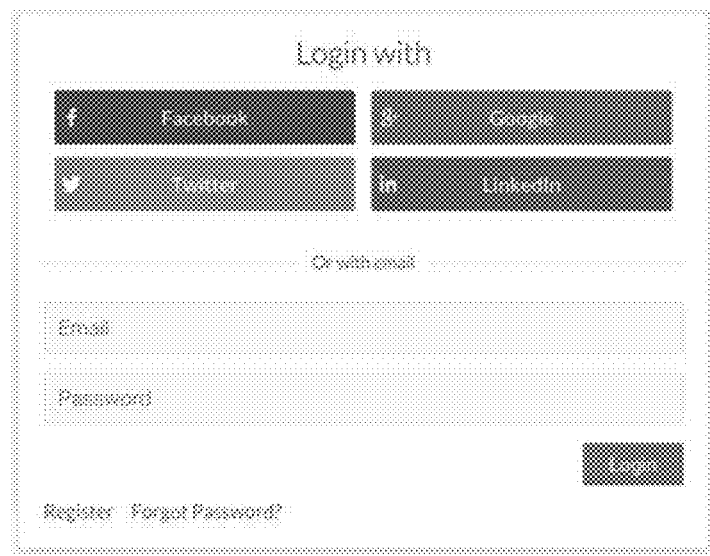
FIG. 3 illustrates a graphical user interface (GUI) screen shot, which may be used to provide social login interfaces in accordance with an embodiment of the present invention.
Figure 4:
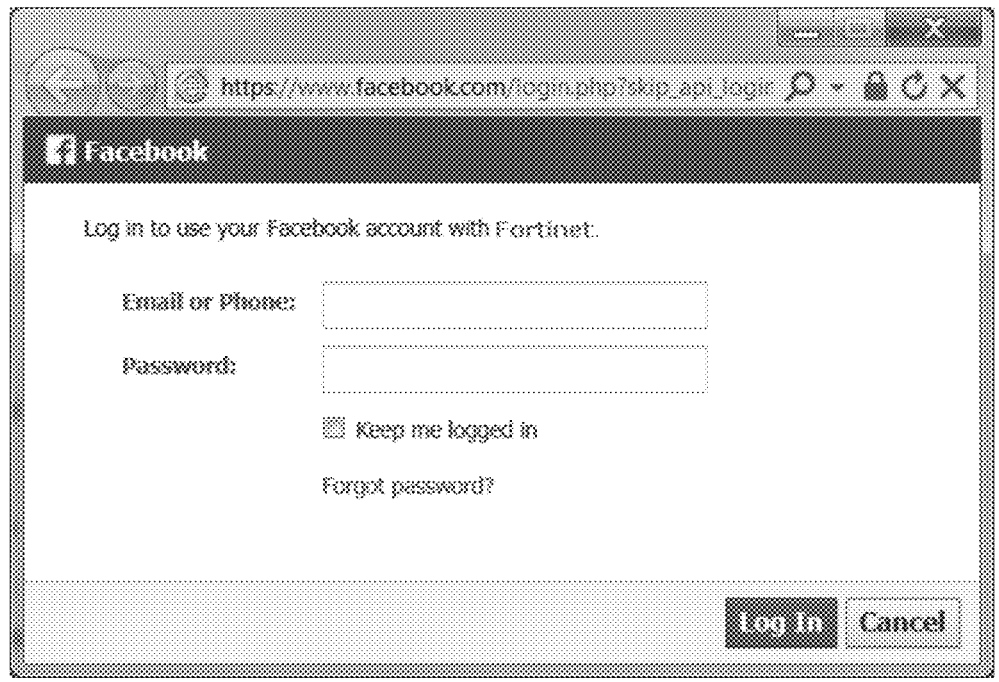
FIG. 4 illustrates a graphical user interface (GUI) screen shot, which may be used to authenticate a user of a social media network in accordance with an embodiment of the present invention.

At block 205, a social login interface of a social media network is sent to the user's device for user authentication. FIG. 3 shows a graphical user interface that includes multiple links to social login webpages of multiple social media networks. The user may select any one of the social login links to jump to a corresponding user authentication webpage of a social media network. FIG. 4 shows an example of a user authentication webpage of the social login service provided by Facebook. The private network, i.e., Fortinet, that is asking for the social login is shown on the social login webpage as the third party who is requesting the social login. The user may input his personal social media network account authentication information through the social login interface. During the social login process, the user may also allow the private network to access his user profile, including his membership information, with the enterprise account. If the user's personal social media network account authentication information is correct, an authentication confirmation, such as an access token, is transferred to the private network.

At block 206, the user management server of the private network receives the access token. The steps shown at blocks 204-206 may be based on OAuth, which is an open standard of authentication well-known to those skilled in art, as such further description of OAuth is omitted for sake of brevity.

At block 207, the user management server of the private network retrieves a user profile of the personal social media network account from the social media network using the access token provided by the social media network at block 206. The user profile may include personal identification information because the user has granted the social media network the right to provide his personal information to the private network when the user performed the social login. The user profile may contain the user's identification within the social media network, his email address and membership information. For example, if the social media network user is a member of the "R&D" group of Fortinet within Facebook, his user profile may contain this membership information. The user management server may determine the user is a member of a group of the enterprise account of the social media network based on the user profile.

At block 208, the user management server grants access rights to the user based on the membership of the user with the enterprise account. In one example, if the user is a member of the enterprise account "Fortinet" within Facebook or a member of an open group, such as "customer" of "Fortinet" on Facebook, the user management server may grant to the user basic access rights, such as the ability to access the Internet through hotspots of the private network. In another example, if the user is determined to be a member of a closed group such as the "R&D" group of "Fortinet" on Facebook, the user management server may grant access rights to the user equivalent to those granted to all other members of the "R&D" group of the private network.

At block 209, the user management server may create a network security policy for the user at a firewall in order to control activities of the user within the private network. The security policy of the user can be based on the memberships of the user with the enterprise account of the social media network. For example, if the user belongs to an internal group of the enterprise account within a social media network, network traffic accessing internal resources of the private network from the user's client machine is allowed. Managing security policies to control network traffic for users is well-known to those skilled in the art, therefore a detailed description thereof is omitted for sake of brevity.

At block 210, the user's social media network profile may be added to a global address list (GAL) by the user management server. The global address list is used for users of the private network to search for users' personal information, including social media network information. Managing a global address list for users of networks is well-known to those skilled in the art, therefore a detailed description thereof is omitted for sake of brevity.

Further, the administrator of the private network may deny a user from accessing the private network by removing the user from the enterprise social media network account. For example, when an employee who is a member of the "R&D" group of "Fortinet" on Facebook leaves Fortinet, the administrator may remove his personal social media network account from the "R&D" group of the enterprise account on Facebook. Then, the user can no longer access the private network as member of the R&D group through the social login.

In embodiments of the present invention, the administrator manages users' authentication and network access rights and security policies via a social media network instead of through an authentication sever within a private network. The burden of creating unique user IDs and maintaining passwords at a private network is thus shifted from the administrator of the private network to the users. In this manner, the administrator of the private network may manage user groups and security policies via a social media network that provides a social login service.

Figure 5:
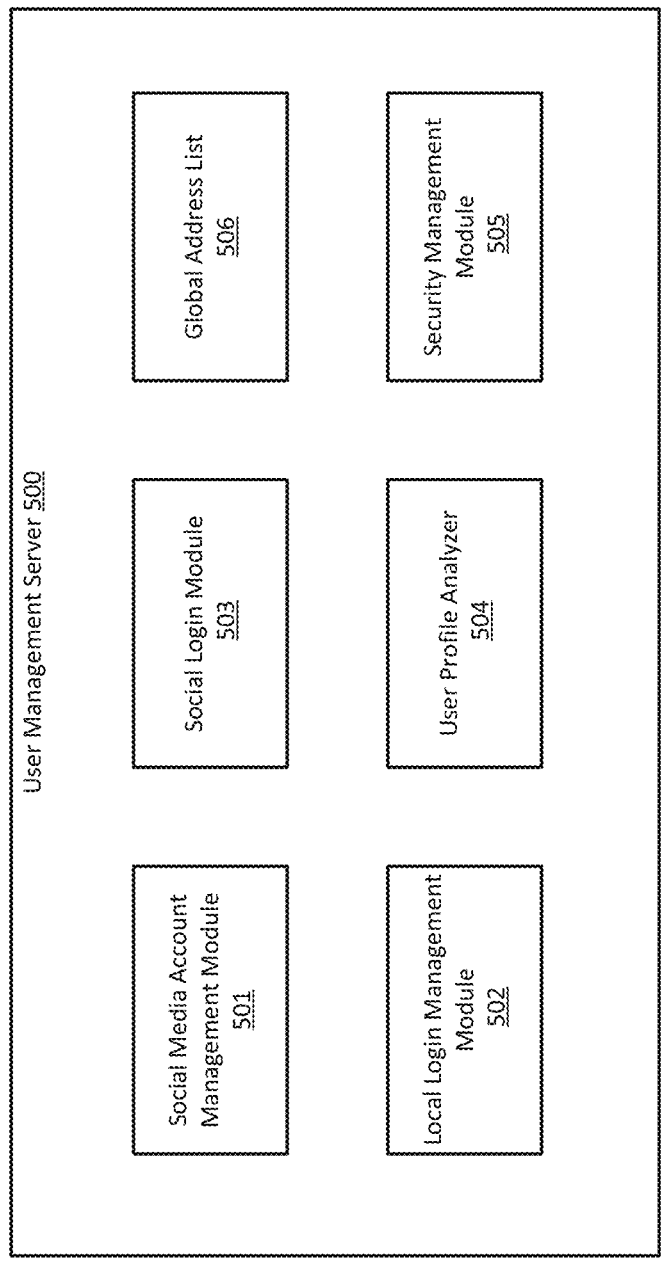
FIG. 5 is a block diagram illustrating functional units of a user management server of a private network in accordance with an embodiment of the present invention.

FIG. 5 is a block diagram illustrating functional units of a user management server 500 of a private network in accordance with an embodiment of the present invention. In the present example, user management server 500 may include a social media network account management module 501, a local login management module 502, a social login module 503, a user profile analyzer 504, a security management module 505, a global address list 506.

Social media account management module 501 is used for managing an enterprise account for a private network within a social media network that provides social login services to third party networks. Social media account management module 501 may also create multiple groups under/within the enterprise account to allow different social media network users to join. Groups under the enterprise account within the social media network may be open groups that allow any social media network user to join without approval. Additionally or alternatively, groups under the enterprise account may be closed groups that in which only approved social media network users are permitted to join. When a social media network user applies to join a closed group, social media account management module 501 may receive a request from the social media network user. Then, social media account management module 501 may automatically allow or deny the request based on whether the social media network user belongs to a corresponding group within the enterprise with reference to a personnel database or the like, for example, maintained within the private network of the enterprise. Alternatively, human input (e.g., from a network administrator) may be required before allowing a social media network user to join a closed group of an enterprise account on the social media network.

Local login management module 502 is used for receiving a user authentication request from a user's client device within the private network. Local login management module 502 may provide one or more social login links to the user's client machine. The user may select one of the social login links to authenticate himself to the social media network. The social login processing performed by the social media network may be based on an authentication protocol, such as OAuth.

Social login module 503 is used for receiving social login confirmation from a social media network. The social login confirmation may be in the form of an access token that is issued by the social media network after the social media network user is authenticated by the social media network. The access token may be used for accessing the social network user's information by user management server 500 from the private network.

User profile analyzer 504 is used for retrieving the social media network user's profile and analyzing the social relationship of the user with the enterprise's account on the social media network at issue. Personal identification information as well as social relationship information of the social media network user may be retrieved from the social media network through appropriate application program interfaces (APIs) using the access token received from the social media network. User profile analyzer 504 may determine whether the social media network user is a member of an appropriate group (e.g., an open group or a closed group) of an enterprise account on the social media network.

Security management module 505 is used for managing the user's security policy within the private network based on the determined relationship/membership of the user with the enterprise account. Access rights of the corresponding group within the private network may be granted to the user if the user belongs to the group of the enterprise account on the social media network. For example, if the user belongs to an open group of the enterprise account on the social media network, limited or basic rights, such as the ability to access the Internet through APs of the private network, may be granted to the user. Alternatively, if the user is determined to belong to a closed group of the enterprise account on the social media network, more expansive or higher access rights may be granted to the user. Security management module 505 may also add social media network information of the user to global address list 506 to facilitate searching and general availability of the user's personal information to users of the private network through global address list 506.

When the user is no longer employed by the enterprise, social media account management module 501 may remove the user's personal social media account from all groups of the enterprise account on the social media network. In this manner, the user will no longer be able to obtain more than basic rights on the private network by way of the social login authentication process described above.

Figure 6:
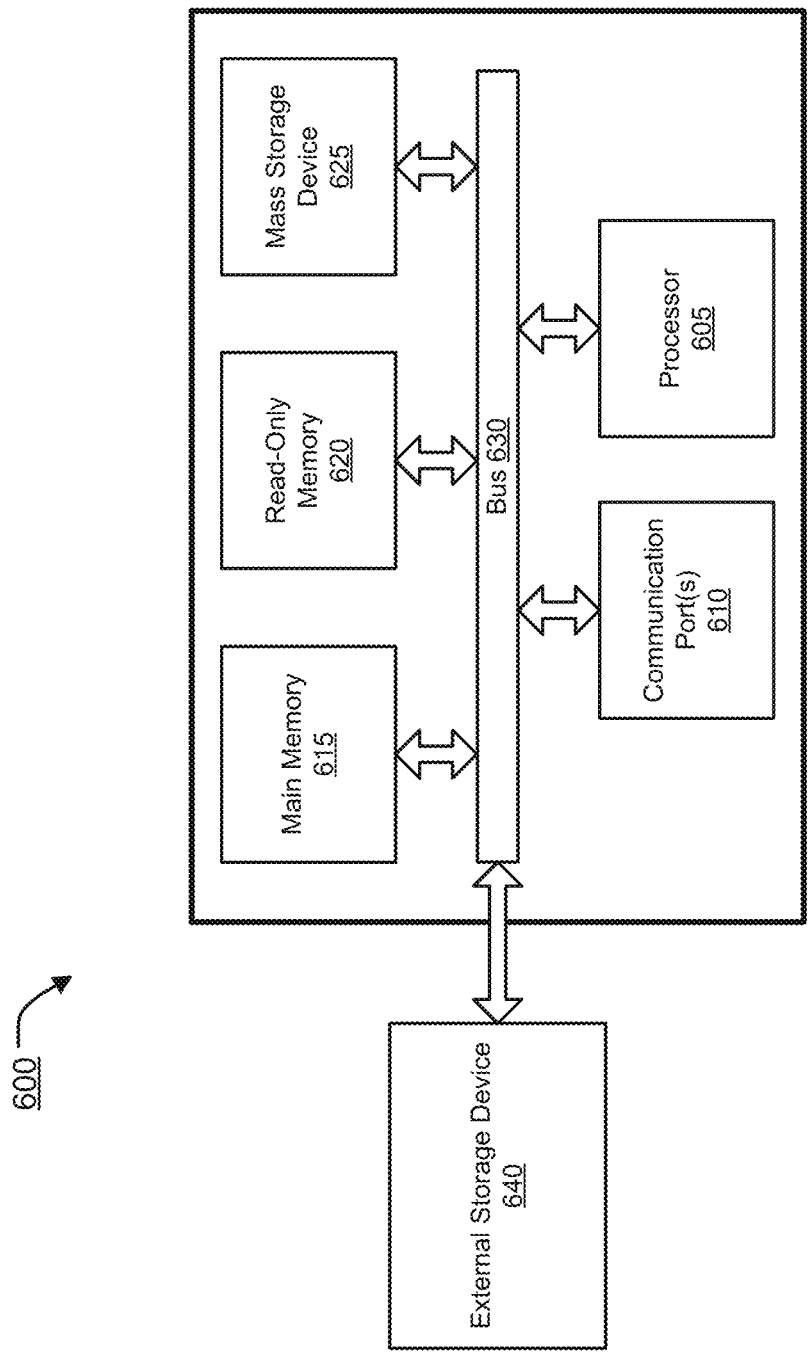
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a network security appliance (e.g., network security appliance 111), a server (e.g., user management server 500), or a client workstation (e.g., local PC 113).

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
receiving, by a network security appliance of a private network of an enterprise, an authentication request from a client machine coupled in communication with the private network;
responsive to the authentication request, causing a user of the client machine to be authenticated by a social media network through a personal social media network account of the user by directing, by the network security appliance, the client machine to a social login interface of the social media network;
responsive to a successful authentication by the user with the social media network via the social login interface, receiving, by the network security appliance, an access token from the social media network;
retrieving, by the network security appliance, a user profile of the user from the social media network by requesting the user profile via an application programming interface (API) of the social media network and supplying the access token;
determining, by the network security appliance, social relationship information from the user profile;
assigning, by the network security appliance, a local network security policy to the user based on the social relationship information, wherein the local network security policy defines access rights by the user for a subset of network resources of a plurality of network resources associated with the private network; and
applying, by the network security appliance, the local network security policy to access requests made by the client device in relation to one or more of the plurality of network resources.

2. The method of claim 1, further comprising:
creating an enterprise social media network account for the private network on the social media network; and
creating one or more groups under the enterprise social media network account.

3. The method of claim 2, further comprising:
receiving, by the enterprise social media network account, a request from the personal social media network account of the user to join the enterprise social media network account or a group of the one or more groups;
causing, by the network security appliance, the enterprise social media network account to approve the request from the personal social media network account.

4. The method of claim 2, wherein the social relationship information comprises membership status of the personal social media network account within the enterprise social media network account or within a group of the one or more groups.

5. The method of claim 4, wherein said assigning, by the network security appliance, a local network security policy to the user based on the social relationship information comprises assigning the local network security policy to the user based on the membership status.

6. The method of claim 5, wherein:
when the user is a member of (i) an open group of the one or more groups or (ii) an open enterprise social media network account, the assigned local security policy provides limited access rights to the user within the private network; and
when the user is a member of (i) a closed group of the one or more groups or (ii) a closed enterprise social media network account, the assigned local security policy provides access rights to the user within the private network that are greater than those available via the limited access rights.

7. The method of claim 6, wherein the access rights granted to the user are equivalent to those granted to a user group within the private network corresponding to the closed group.

8. The method of claim 1, further comprising:
creating, by the network security appliance, a global address list (GAL) within a local authentication server; and
adding, by the network security appliance, personal information of the user extracted from the user profile to the GAL.

9. The method of claim 2, further comprising revoking, by the network security appliance, access by the user to the private network by deleting the personal social media network account of the user from the one or more groups.

10. The method of claim 1, wherein the social login interface is based on an open authentication protocol.

11. The method of claim 1, wherein the social relationship information comprises information indicative of one or more of:
a friend link within the social media network; and
a follower link within the social media network.

12. A network security appliance comprising:
non-transitory storage device having embodied therein instructions representing a security application; and
one or more processors coupled to the non-transitory storage device and operable to execute the security application to perform a method comprising:
receiving an authentication request from a client machine coupled in communication with a private network of an enterprise that is protected by the network security appliance;
responsive to the authentication request, causing a user of the client machine to be authenticated by a social media network through a personal social media network account of the user by directing the client machine to a social login interface of the social media network;
responsive to a successful authentication by the user with the social media network via the social login interface, receiving an access token from the social media network;
retrieving a user profile of the user from the social media network by requesting the user profile via an application programming interface (API) of the social media network and supplying the access token;
determining social relationship information from the user profile;
assigning a local network security policy to the user based on the social relationship information, wherein the local network security policy defines access rights by the user for a subset of network resources of a plurality of network resources associated with the private network; and
applying the local network security policy to access requests made by the client device in relation to one or more of the plurality of network resources.

13. The network security appliance of claim 12, wherein the method further comprises:
creating an enterprise social media network account for the private network on the social media network; and
creating one or more groups under the enterprise social media network account.

14. The network security appliance of claim 13, wherein the method further comprises:
receiving from the enterprise social media network account information regarding a request from the personal social media network account of the user to join the enterprise social media network account or a group of the one or more groups;
causing the enterprise social media network account to approve the request from the personal social media network account.

15. The network security appliance of claim 13, wherein the social relationship information comprises membership status of the personal social media network account within the enterprise social media network account or within a group of the one or more groups.

16. The network security appliance of claim 15, wherein said assigning a local network security policy to the user based on the social relationship information comprises assigning the local network security policy to the user based on the membership status.

17. The network security appliance of claim 16, wherein:
when the user is a member of (i) an open group of the one or more groups or (ii) an open enterprise social media network account, the assigned local security policy provides limited access rights to the user within the private network; and
when the user is a member of (i) a closed group of the one or more groups or (ii) a closed enterprise social media network account, the assigned local security policy provides access rights to the user within the private network that are greater than those available via the limited access rights.

18. The network security appliance of claim 17, wherein the access rights granted to the user are equivalent to those granted to a user group within the private network corresponding to the closed group.

19. The network security appliance of claim 13, wherein the method further comprises revoking access by the user to the private network by deleting the personal social media network account of the user from the one or more groups.

20. The network security appliance of claim 12, wherein the social relationship information comprises information indicative of one or more of:
a friend link within the social media network Fac; and
a follower link within the social media network.

* * * * *

UNITED STATES PATENT AND TRADEMARK OFFICE
CERTIFICATE OF CORRECTION

PATENT NO. : 10,171,506 B2  
APPLICATION NO. : 15/075819  
DATED : January 1, 2019  
INVENTOR(S) : Pankajkumar Chechani Page 1 of 1

It is certified that error appears in the above-identified patent and that said Letters Patent is hereby corrected as shown below:

In the Claims

Claim 20:
Column 14, Line 52, delete "Fac"

Signed and Sealed this
Second Day of April, 2019

Andrei Iancu
*Director of the United States Patent and Trademark Office*